US006857395B2

(12) United States Patent  
Williams

(10) Patent No.: US 6,857,395 B2
(45) Date of Patent: Feb. 22, 2005

(54) ANIMAL EAR HOLDER APPARATUS

(75) Inventor: Darla Williams, 3289 Highfalls Rd., Jackson, GA (US) 30233

(73) Assignee: Darla Williams, Winston, GA (US)

( * ) Notice: Subject to any disclaimer, the term of this patent is extended or adjusted under 35 U.S.C. 154(b) by 0 days.

(21) Appl. No.: 10/283,897

(22) Filed: Oct. 31, 2002

(65) Prior Publication Data

US 2003/0079694 A1 May 1, 2003

Related U.S. Application Data

(63) Continuation-in-part of application No. 09/855,161, filed on May 14, 2001, now Pat. No. 6,508,203.

(51) Int. Cl.$^7$ ............................................. A01K 15/00
(52) U.S. Cl. .................... 119/712; 119/814; 54/80.1; 54/6.1; 2/423
(58) Field of Search ..................... 19/712, 814, 837, 19/851, 850; 54/71, 80.1, 6.1, 6.2

(56) References Cited

U.S. PATENT DOCUMENTS

| 4,040,239 | A | * | 8/1977 | Powell ...................... 54/80.1 |
| 4,214,420 | A | * | 7/1980 | Ferree ........................... 54/35 |
| 5,321,937 | A | * | 6/1994 | Hamilton .................... 54/80.2 |
| 5,540,189 | A | * | 7/1996 | Masson ....................... 119/850 |
| 5,685,021 | A | * | 11/1997 | Tsujino .......................... 2/425 |
| 5,713,188 | A | * | 2/1998 | Chisholm .................... 54/80.1 |
| 6,128,891 | A | * | 10/2000 | McMahon ................... 54/80.1 |
| 6,216,642 | B1 | * | 4/2001 | Hung ........................... 119/850 |

* cited by examiner

Primary Examiner—Yvonne Abbott

(57) ABSTRACT

A pair of ear retaining members designed to hold the ears of an animal in a substantially forward position to control undesired behavior. A Strap attaches both ear retaining members together and further holds the ears in the ear retaining members. The ear retaining members are held in place by straps which go thru slots in the ear retaining members and proceed under the throatlatch of the animal and attaches to its own end. Ear retaining members are made from semi-flexible material.

10 Claims, 4 Drawing Sheets

ANIMAL EAR HOLDER APPARATUS

This application is a continuation-in-part of, and claims priority from, U.S. patent application Ser. No. 09/855,161 filed May 14, 2001, entitled "Animal Ear Holder Apparatus and Method of Obtaining Desired Animal Behavior", issued as U.S. Pat. No. 6,508,203 on Jan. 21, 2003, the disclosure of which is incorporated herein by this reference.

BACKGROUND OF THE INVENTION

The improvements relate generally to the problem of the earpieces of claim 21, of U.S. patent application Ser. No. 09/855,161, not staying secure in position on the ears. Using a bridle or halter for the head gear, the ear pieces could be easily displaced.

SUMMARY OF THE INVENTION

It is the object of these improvements to make a product that is carried more secure on the animal.

Flat view of the earpieces

Flat view of the throatlatch pad

Figure 1:
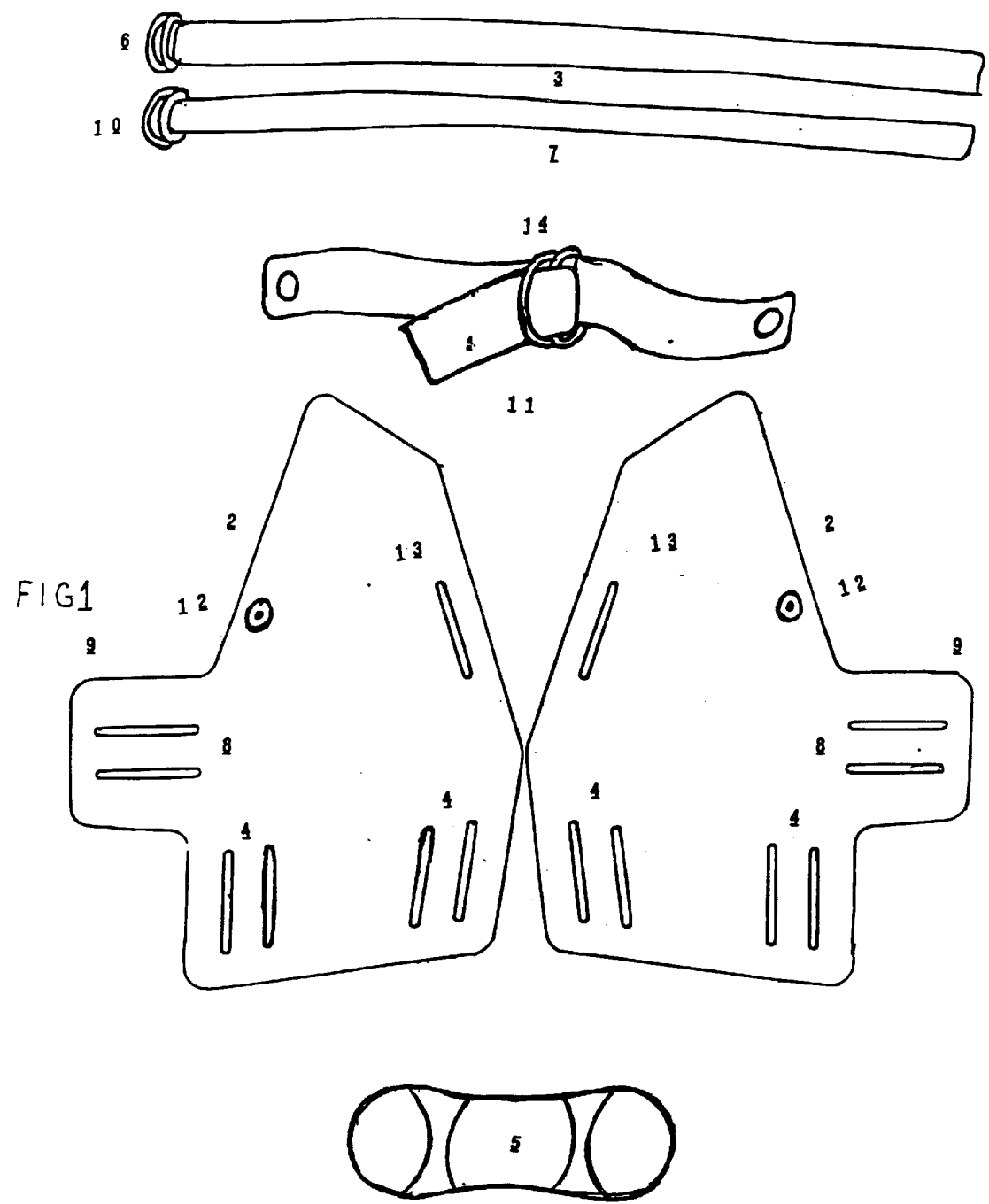
FIG. 1
Figure 2:
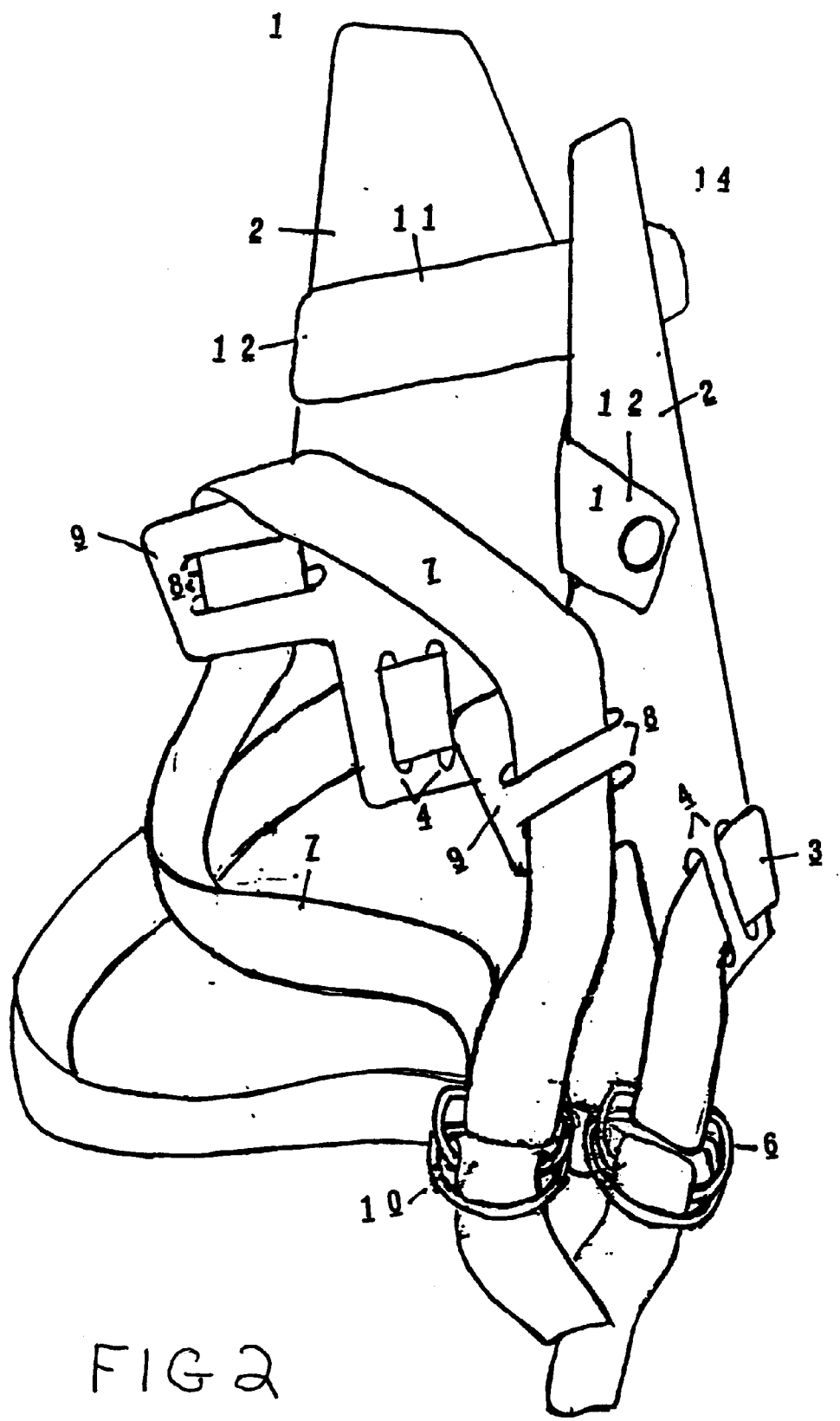
Figure 3:
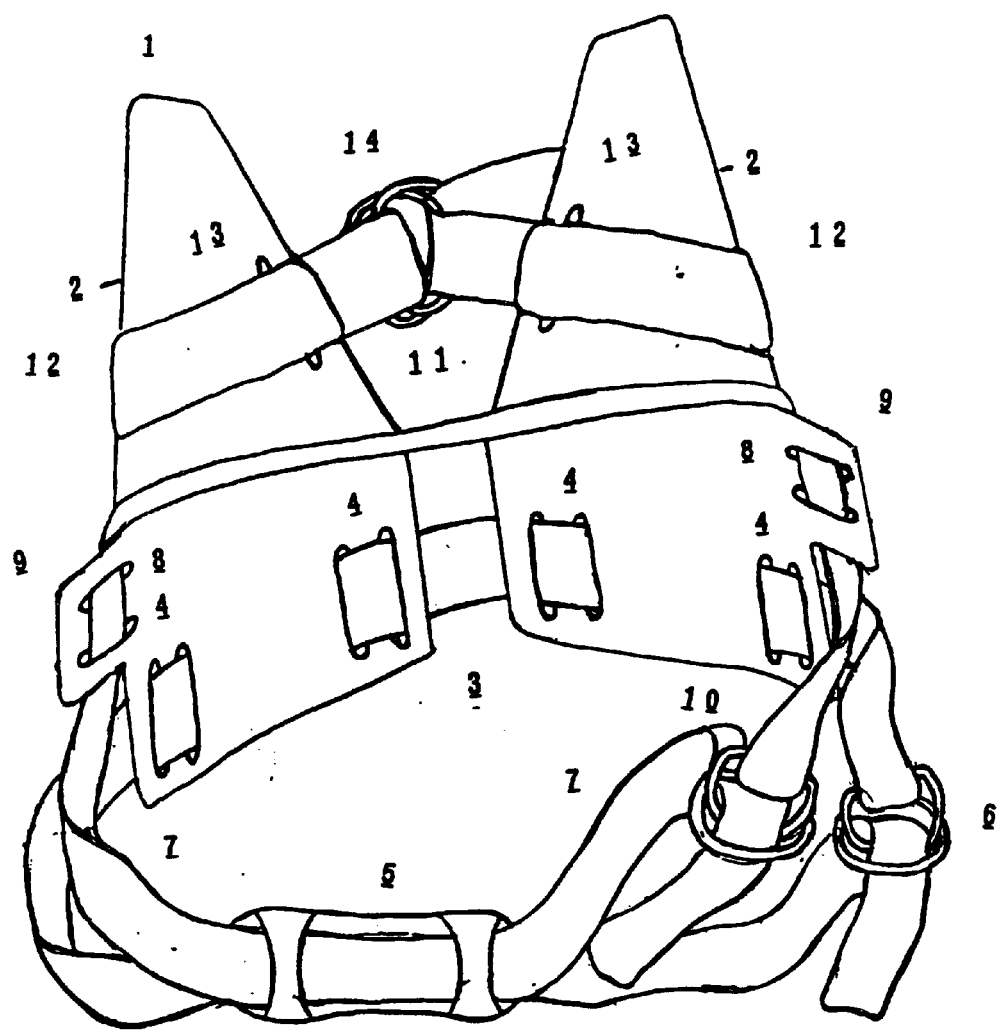
Figure 4:
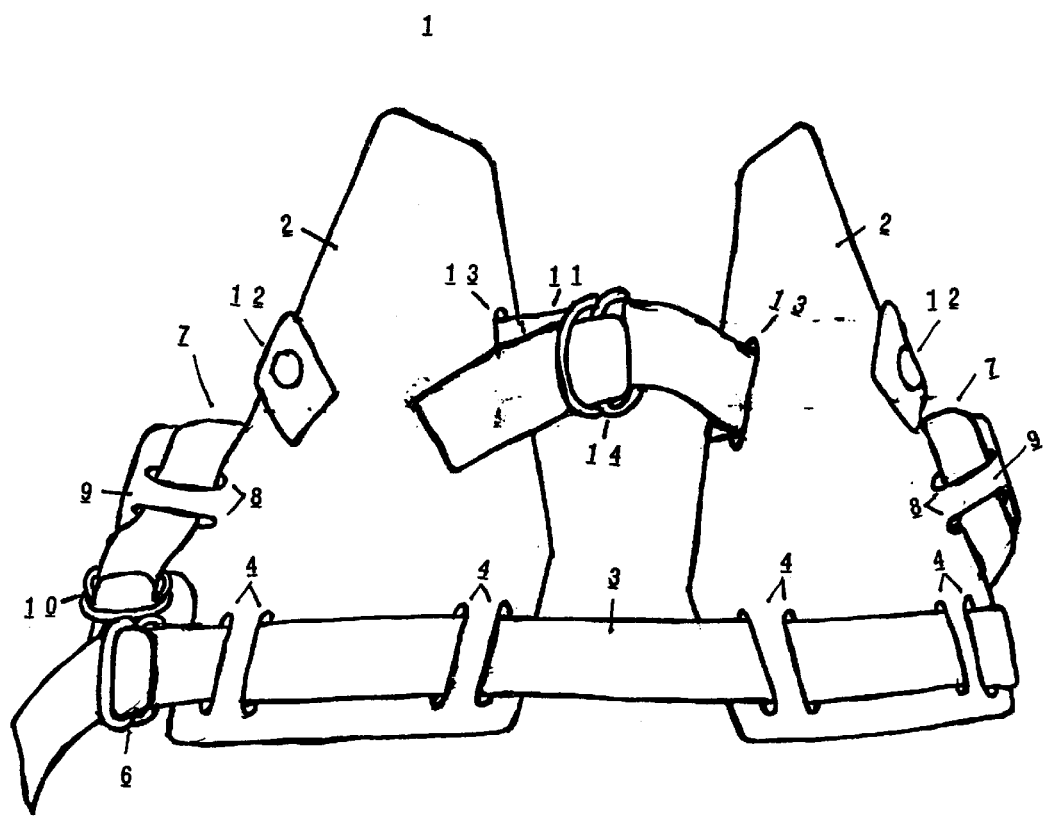

Flat view of the headgear securing straps

Flat view of the ear securing straps

FIG. 2

Perspective side view of product with improvements.

FIG. 3

Perspective front view of the product with improvements.

FIG. 4

Perspective rear view of the product with improvements.

DESCRIPTION OF THE IMPROVEMENTS

Referring now to the drawings and in accordance with the invention, there is illustrated an ear holder device 1 for holding the ears in a substantially forward position to controll undesired behavior. The device in effect consists of an ear receiving member 2 secured with strap 3 weaving through slots 4 in second end of ear receiving member 2. Passes over the poll, behind the ears, and weaves through the slots 4 in second end of other ear receiving member, through throatlatch pad 5 and connects to its own end 6. Secured also by strap 7 which passes through slots 8 in tab 9 at lateral edge 12 of ear receiving member 2 across the forehead and continuing through slots 8 in tab 9 laterally protruding from second ear receiving member 2 through throatlatch pad 5 and securing to its own end 10. Straps 11 designed to secure ears in ear receiving member 2 attach to ear receiving member 2 at the lateral edge 12 of ear receiving member 2 and pass across the front of the ear through slots 13 in medial edge of ear receiving member 2 then attached to the opposite ear receiving member 2 via another strap from other ear receiving member 2. Further straps 11 are adjustable by attachment 14.

What is claimed is:

1. An ear holder device for animal headgear comprising: of at least one ear receiving member having a first end and a second end; and means for securing said ear receiving member to the animal headgear designed to hold at least one ear receiving member in a forward position wherein said means for securing said ear receiving member to the animal headgear is a channel defined by said second end of said ear receiving member and wherein the animal headgear is carried and secured within said channel; wherein said ear receiving member is a semi-flexible material.

2. The device of claim 1 comprising: of at least one ear receiving member having a first end and a second end; and means for securing said ear receiving member to the animal headgear designed to hold at least one ear receiving member in a forward position wherein said means for securing said ear receiving member to the animal headgear is a channel defined by said second end of said ear receiving member and wherein the animal headgear is carried and secured within said channel; including a series of slots, wherein the animal headgear is carried and secured within said slots.

3. The device of claim 1 comprising of: of at least one ear receiving member having a first end and a second end; and means for securing said ear receiving member to the animal headgear designed to hold at least one ear receiving member in a forward position wherein said means for securing said ear receiving member to the animal headgear is a channel defined by said second end of said ear receiving member and wherein the animal headgear is carried and secured within said channel; wherein said ear receiving member has a tab with slots laterally protruding from ear receiving member to carry and secure animal headgear.

4. The device of claim 1 for animal headgear comprising: of at least one ear receiving member having a first end and a second end; and means for securing said ear receiving member to the animal headgear designed to hold at least one ear receiving member in a forward position wherein said means for securing said ear receiving member to the animal headgear is a channel defined by said second end of said ear receiving member and wherein the animal headgear is carried and secured within said channel; wherein straps carried and secured in slots in second end of said ear receiving member and in slots in tabs laterally protruding from the ear receiving member.

5. The device of claim 1 for animal headgear comprising: of at least one ear receiving member having a first end and a second end; and means for securing said ear receiving member to the animal headgear designed to hold at least one ear receiving member in a forward position wherein said means for securing said ear receiving member to the animal headgear is a channel defined by said second end of said ear receiving member and wherein the animal headgear is carried and secured within said channel; further comprising a strap carried and secured in slots in second end of ear receiving member pass over the poll and under the throatlatch fastening to the other end of said strap.

6. The device of claim 1 for animal headgear comprising: of at least one ear receiving member having a first end and a second end; and means for securing said ear receiving member to the animal headgear designed to hold at least one ear receiving member in a forward position wherein said means for securing said ear receiving member to the animal headgear is a channel defined by said second end of said ear receiving member and wherein the animal headgear is carried and secured within said channel; further comprising a strap carried and secured in slots in laterally protruding tabs from ear receiving member lies across forehead of animal, passes under throatlatch fastening to the other end of said strap.

7. The device of claim 1 for animal headgear comprising: of at least one ear receiving member having a first end and a second end; and means for securing said ear receiving member to the animal headgear designed to hold at least one ear receiving member in a forward position wherein said means for securing said ear receiving member to the animal headgear is a channel defined by said second end of said ear receiving member and wherein the animal headgear is carried and secured within said channel; further comprising a flexible pad by which said headgear straps pass thru and placed under the throatlatch of animal, making headgear more comfortable and secure.

8. The device of claim 1 for animal headgear comprising: of at least one ear receiving member having a first end and a second end; and means for securing said ear receiving member to the animal headgear designed to hold at least one ear receiving member in a forward position wherein said means for securing said ear receiving member to the animal headgear is a channel defined by said second end of said ear receiving member and wherein the animal headgear is carried and secured within said channel; wherein, said ear receiving member is carried and secured to animal by means of straps passing thru said slots and proceeding under throatlatch and attaching to its own end.

9. The device of claim 1 for animal headgear comprised of at least one ear receiving member having a first end and a second end; and means for securing said ear receiving member to the animal headgear designed to hold at least one ear receiving member in a forward position wherein said means for securing said ear receiving member to the animal headgear is a channel defined by said second end of said ear receiving member and wherein the animal headgear is carried and secured within said channel; further comprising an adjustable band connecting said ear pieces to one another.

10. The device of claim 1 for animal headgear comprising: of at least one ear receiving member having a first end and a second end; and means for securing said ear receiving member to the animal headgear designed to hold at least one ear receiving member in a forward position wherein said means for securing said ear receiving member to the animal headgear is a channel defined by said second end of said ear receiving member and wherein the animal headgear is carried and secured within said channel; further comprising a slot in the medial portion of said ear piece to carry strap to secure ear in ear piece.

* * * * *